(12) United States Patent
Ohnishi et al.

(10) Patent No.: US 6,784,590 B2
(45) Date of Patent: Aug. 31, 2004

(54) PERMANENT MAGNET MOTOR

(75) Inventors: Kazuo Ohnishi, Gunma (JP); Toshimi Abukawa, Gunma (JP); Tokio Sekiguchi, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 155 days.

(21) Appl. No.: 10/108,837

(22) Filed: Mar. 28, 2002

(65) Prior Publication Data

US 2003/0184181 A1 Oct. 2, 2003

(30) Foreign Application Priority Data

Mar. 30, 2001 (JP) .......................................... 2001-099396
Mar. 30, 2001 (JP) .......................................... 2001-099397

(51) Int. Cl.[7] .......................... H02K 21/12; H02K 1/14
(52) U.S. Cl. ................................ 310/254; 310/156.01
(58) Field of Search ............................... 310/156, 152, 310/261, 254

(56) References Cited

U.S. PATENT DOCUMENTS

| | | | | |
|---|---|---|---|---|
| 4,112,319 A | * | 9/1978 | Field | 310/49 R |
| 4,516,048 A | * | 5/1985 | Brigham | 310/254 |
| 6,545,376 B2 | * | 4/2003 | Ohnishi et al. | 310/49 R |

FOREIGN PATENT DOCUMENTS

| | | | | |
|---|---|---|---|---|
| JP | 58-119754 | * | 7/1983 | H02K/21/00 |
| JP | 61-058458 | * | 3/1986 | H02K/21/22 |
| JP | 61-094547 | * | 5/1986 | H02K/21/00 |
| JP | 62-268347 | * | 11/1987 | H02K/29/00 |
| JP | 63048147 A | | 2/1988 | |
| JP | 07079541 | | 3/1995 | |
| JP | 8-308198 | * | 11/1996 | H02K/29/00 |
| JP | 2000-156958 | * | 6/2000 | H02K/21/22 |

* cited by examiner

*Primary Examiner*—Burton Mullins
(74) *Attorney, Agent, or Firm*—Patterson, Thuente, Skaar & Christensen, P.A.

(57) ABSTRACT

A permanent magnet motor comprising a permanent magnet and an armature having a plurality of winding grooves facing the permanent magnet with an air gap therebetween. The armature has a plurality of auxiliary grooves on a magnetic pole surface thereof, wherein a composite of two vectors of cogging torque generated by the auxiliary grooves is deviated by 180° or 120° from a vector of cogging torque generated by the winding grooves in the sixth harmonic plane, and wherein a width of a portion of an air gap magnetic flux density waveform that includes a value that is more than 90% of a peak value of the air gap magnetic flux density waveform is less than 80% or 86% of a width of a pole pitch portion of the air gap magnetic flux density waveform. Each vector of cogging torque generated by each of the plurality of auxiliary grooves is deviated by 180° or 120° from a vector of cogging torque generated by the winding grooves in the sixth harmonic plane, respectively, and wherein a width of a portion of an air gap magnetic flux density waveform that includes a value that is more than 90% of a peak value of the air gap magnetic flux density waveform is less than 80% or 86% of a width of a pole pitch portion of the air gap magnetic flux density waveform.

8 Claims, 10 Drawing Sheets

PERMANENT MAGNET MOTOR

BACKGROUND OF THE INVENTION

1. Field of the Invention

The present invention relates to a permanent magnet motor, and more particularly to an electric motor having a permanent magnet and an armature facing the permanent magnet with a gap therebetween, capable of reducing cogging torque.

2. Description of the Prior Art

A conventionally implemented permanent magnet motor, wherein a cogging torque is reduced by providing auxiliary grooves is disclosed in the Japanese Patent Publication No. 63048147.

According to such permanent magnet motor, however, the cogging torque cannot be reduced sufficiently, because a normal magnetizing yoke is used, so that the magnetic wave form thereof is not suitable.

Minimization of cogging torque generated in the grooves in the iron core

The torque generated in the general electromagnetic machine system can be expressed by Formula 1 under the condition of constant magnetic flux according to the principle of virtual work.

$$T = -\frac{\partial W_m}{\partial \theta} \quad (1)$$

Here, Wm denotes a total magnetic energy, and $\theta$ denotes a rotation angle.

The cogging torque will now be considered. The magnetic energy $W_m$ due to the permanent magnet is stored in the magnet, the iron core and the air gap portion. The magnetic energy in the magnet is almost constant, and the energy in the iron core is very small because the iron core has a high permeability. Accordingly, a cogging torque $T_c$ can be expressed by Formula 2 by the angular differentiation of only a magnetic energy $W_g$ in the air gap portion.

$$T_c = -\frac{\partial W_g}{\partial \theta} \quad (2)$$

In order to simplify, it is assumed that the iron core is rotated, and the magnetic energy is stored in a cylindrical air gap portion entirely, and that a magnetic energy is $W_g(\theta)$ when the relative angle of the stator and the rotor is $\theta$. The $W_g(\theta)$ can be expressed by Formula 3 by integration by rotation at the air gap portion.

$$W_g(\theta) = \frac{l_g L_s r_g}{2\mu_0} \oint_C B_g^2(\theta + \gamma) d\gamma \quad (3)$$

Here, $l_g$ denotes an air gap length, $L_s$ denotes an effective thickness of iron core, $\mu_0$ denotes a vacuum permeability, $r_g$ denotes a mean radius of air gap portion, and $B_g(\theta+\gamma)$ denotes a distribution of the magnetic flux density in the air gap with respect to an angle $\gamma$ in the iron core rotated by an angle $\theta$.

In a smoothed iron core 1 having no winding grooves as shown in FIG. 1, no cogging torque due to the rotation is generated because there are no winding grooves. Accordingly, the magnetic energy $W_g(\theta)$ in the Formula 3 is constant having no relation to the rotation angle ($\theta$). On the contrary thereto, it is considered that if the winding grooves exist, $B_g(\xi)$ or $B_g 2(\xi)$ lacks substantially at the angle of $\gamma$, so that the cogging torque is generated. Here, $\xi=\theta+\gamma$. The $W_g$ can be expressed by Formulas 4–6, if the lacked magnetic energy due to the winding grooves is $\delta W_g$.

$$\delta W_g = \sum_{k=1}^{3} w_g(\theta + \gamma_k) \quad (5)$$

$$w_g(\theta, \gamma_k) = \frac{l_g L_s}{2\mu_o} k_{sk} B_g^2(\theta + \gamma_k) \quad (6)$$

Here, $W_g$ denotes a magnetic energy in the air gap portion of the smoothed iron core, s denotes a number of grooves, $\gamma k$ denotes an angle of a No. k winding groove, $k_{sk}$ denotes a coefficient determined by a figure of the No. k winding groove, and $B_g(\theta+\gamma k)$ is a magnetic flux density in the air gap at a position of No. k groove.

By putting the Formulas 4 to 5 in the Formula 2, the cogging torque can be expressed by Formula 7.

$$T_c = \frac{\partial(\delta W_g)}{\partial \theta} = \frac{l_g L_s}{2\mu_o} \frac{\partial}{\partial \theta}\left(\sum_{k=1}^{s} k_{sk} B_g^2(\theta + \gamma_k)\right) \quad (7)$$

The right side of the Formula 7 is the sum of magnetic energy portions lost by the winding grooves. It can be said that it is similar to the function of the hole in the semiconductor engineering. Specifically, it can be said that the cogging torque is generated by the reduction of the magnetic energy due to the grooves. Accordingly, a manner for reducing the cogging torque is now studied under the point of view as follows.

FIG. 2 shows results of the distribution of the magnetic flux density in the air gap measured by providing a hole element on the surface of the iron core and rotating the iron core, in order to know a figure of $B_g(\xi)$. The analysis is proceeded on the assumption that a figure of the distribution of the magnetic flux density in the air gap is shown in FIG. 3 with respect to the electrical angle $p \xi$. $\beta$ denotes a ratio of an inclined portion. It is supposed that the magnetic flux density is varied as a figure of a fourth part of a sine wave in a section corresponding to $\beta$ shown in Formula 8.

$$(0 < \beta \leq 1) \quad (8)$$

The $B_g(\xi)$ can be expressed by Formula 9.

$$B_g(\xi) \begin{cases} = -1 \text{ for } -\frac{\pi}{2} p\xi < -\frac{\beta\pi}{2} \\ = \sin\frac{p\xi}{\beta} \text{ for } -\frac{\beta\pi}{2} \leq p\xi \leq \frac{\beta\pi}{2} \\ = 1 \text{ for } \frac{\beta\pi}{2} < p\xi \leq \frac{\pi}{2} \end{cases} \quad (9)$$

The Formula 9 can be expressed by Fourier series in the form of Formula 10 consisting of terms of odd number order.

$$B_g(\zeta) = \sum_{n=o}^{\infty} b_{2n-1} \sin((2n-1)p\xi) \quad (10)$$

The coefficient can be expressed by Formula 11 in case of $\beta=0$ and by Formula 12 in case of $0<b<1$.

$$b_{2n-1} = \frac{4}{(2n-1)\pi} \quad (11)$$

$$b_{2n-1} = \frac{4}{(2n-1)\pi(\beta^2(2n-1)^2-1)}\cos\frac{(2n-1)\beta\pi}{2} \quad (12)$$

In case of $\beta=1$, only the fundamental wave is presented. $B_g^2(\xi)$ can be expressed by Formula 13 which is a even function consisting of terms of even number order.

$$B_g^2(\xi) = a_o + \sum_{n=1}^{\infty} a_{2n}\cos 2np\xi \quad (13)$$

FIG. 4 shows the change of each harmonic coefficient $a_{2n}$ of $B_g^2$ with respect to $\beta$. When $\beta$ is zero, it becomes a square wave, and when $\beta$ is 1, it becomes a pure sine wave. The second order component corresponds to the fundamental wave, and becomes larger in value when the order number is smaller in value. The maximum value thereof exists in the middle portion of the change of $\beta$.

By putting Formula 13 in Formula 7, Formula 14 can be obtained.

$$T_c = \frac{l_g L_S}{2\mu_o}\sum_{n=1}^{\infty}\left[\frac{\partial}{\partial\theta}\sum_{k=1}^{s}k_{sk}a_{2n}\cos 2np(\theta+\gamma_k)\right] \quad (14)$$

$$= \frac{l_g L_S}{\mu_o}\sum_{n=1}^{\infty}\left[\sum_{k=1}^{s}npk_{sk}a_{2n}\sin 2np(\theta+\gamma_k)\right]$$

In order to minimize the cogging torque, it is understood that a sum of components due to the winding grooves should be set to zero as shown in Formula 15 in the most of the harmonics of low order (n=1, 2, 3. . . ) which affect largely on the cogging torque.

$$\sum_{k=1}^{s}npk_{sk}a_{2n}\sin 2np(\theta+\gamma_k) = 0 \text{ (n: natural numeral)} \quad (15)$$

This is the principle of minimization of the cogging torque due to the iron core grooves. A manner for reducing the cogging torque with respect to the three-phase permanent magnet motor on the basis of the principle is now considered.

Minimization of the cogging torque in the three-phase winding grooves

A recent conventional small motor of non-lap concentration winding construction will now be studied. The motor generally comprises an annular four-pole permanent magnet, an armature having six magnetic poles, and six winding grooves.

Following conditions must be satisfied for the winding grooves to which three-phase windings can be wound.

(1) A number s of grooves is a multiple number of three.

(2) Three-phase windings having phase difference of 120° in electrical angle can be formed.

Here, the component in the Formula 15 is expressed by a plurality of vectors $A_{nk}$ and named as groove vectors.

The groove vectors $A_{nk}$ can be expressed by Formula 16.

$$A_{nk} = npk_{sk}a_{2n}e^{j2np\xi k} = A_{no}e^{j2np\xi k} \quad (16)$$

FIG. 6A shows vectors in the second harmonic plane of the brushless motor having four-pole permanent magnet and six winding grooves, wherein p=2, s=6 and n=1. FIG. 6B shows vectors in the fourth harmonic plane of the brushless motor having four-pole permanent magnet and six winding grooves, wherein p=2, s=6 and n=2. It is noted from FIG. 6A and FIG. 6B that every three vectors are balanced and the relation of the Formula 15 is certified. However, in case of n=3, all of the vectors $A_{6k}$ are superposed on the same position of 0°, so that the balance cannot be kept. Accordingly, in this case, a cogging torque is generated by the sixth harmonic.

In general, all groove vectors are balanced and Formula 15 is established so far as anisotropic vectors dividing equally the electrical angle 4np π of the harmonic order exist, because No. s angle $\xi_x$ is 2 π (360°) when θ=0. However, the all vectors are superposed in the same direction and not balanced when the distance of the vectors becomes 2$i$ π (i is an integer). In such case, Formula 17 is established if s is 3 m (m is a natural numeral).

$$m = \frac{2np}{3i} \text{ (unbalance condition)} \quad (17)$$

The Formula 17 can be applied to the motor having four-pole permanent magnet and six winding grooves, wherein p=2, m=2, n=3 and i=2. The unbalance condition expressed by the Formula 17 is obtained when p or n is a multiple number of three. In the above motor, the above condition (2) cannot be obtained some times, and the cogging torque is generated also in case that the n is not a multiple number of three.

Accordingly, a combination in which the Formula 17 cannot be established when n is three or a multiple number of three should be selected, in order to reduce the cogging torque.

Table 1 shows a representative example of combinations of the number of the winding grooves and the number of the magnetic poles for minimizing the cogging torque obtained from the above, with respect to the non-lap concentration winding which is excellent windings for the permanent magnet motor. No combination for minimizing the cogging torque exists, because no cogging torque due to the sixth harmonic is generated when the groove number is not more than six. A combination of two grooves and three magnetic poles or three grooves and four magnetic poles used conventionally cannot be said as a combination for minimizing the cogging torque.

TABLE 1

| groove number | magnetic pole number | cogging torque reduction | |
|---|---|---|---|
| | | 6 order | 12 order |
| 9 | 8, 10 | O | O |
| 12 | 10, 14 | O | X |
| 15 | 14, 16 | O | O |
| 18 | 16, 20 | O | O |
| 21 | 20, 22 | O | O |
| 24 | 20, 22, 26, 28 | O | X, O |

Table 1 shows the judgment of the cogging torque balance of twelfth order which should be considered next of the sixth order, wherein cases of the magnetic pole numbers 20 and 28 with the groove number 24 are X (bad), and cases of the magnetic pole numbers 22 and 26 with the groove number 24 are O (good).

FIG. 7A shows relations of vectors in the sixth harmonic with respect to a motor having twelve winding grooves and ten poles (12?S/10-P), and FIG. 7B shows that with respect to a motor having nine winding grooves and eight poles (9-S/8-P).

In the motor shown in FIG. 7A, vectors are concentrated in two vectors deviated by 180° from each other and balanced, whereas in the motor shown in FIG. 7B, vectors are concentrated in three vectors deviated by 120° from one another and balanced.

Combinations of a small groove number and a small magnetic pole number, which are not included in the Table 1 are studied. In this case, the cogging torque is generated because all groove vectors in the sixth harmonic plane are aligned on a line of zero phase. Accordingly, it is effective to provide auxiliary grooves in positions at which the groove vectors are balanced.

It is considered that (a) the auxiliary grooves are provided in opposite phase positions, and (b) the auxiliary grooves are provided in positions deviated by 120° from one another in consideration of FIG. 7A and FIG. 7B. In the case (a), Formula 18 is established if an angle between the winding groove and the auxiliary groove is ζ.

$$\zeta = \pm \frac{(2i+1)\pi}{6p} \text{ (i: integer)} \qquad (18)$$

Here, i is an integer.
Similarly, in the case (b), Formula 19 is established.

$$\zeta = \pm \frac{(i+1/3)\pi}{3p} \qquad (19)$$

Representative examples of the auxiliary groove position ζ according to the Formulas 18 and 19 are shown in Table 2.

TABLE 2

| magnetic pole number | (a) opposite position [Formula (18)] | | (b) 120° position [Formula (19)] | |
|---|---|---|---|---|
| 2p | i = 0 | i = 1 | i = 0 | i = 1 |
| 2 | π/6 (30°) | π/2 (90°) | π/9 (20°) | 4 π/9 (80°) |
| 4 | π/12 (15°) | π/4 (45°) | π/18 (10°) | 4 π/18 (40°) |
| 6 | π/18 (10°) | π/6 (30°) | π/27 (6.7°) | 4 π/27 (26.7°) |
| 8 | π/24 (7.5°) | π/8 (22.5°) | π/36 (5°) | 4 π/36 (20°) |
| 10 | π/6 (30°) | π/12 (15°) | π/45 (4°) | 4 π/45 (16°) |

In this case according to the Formula 19, it is necessary to provide the auxiliary grooves in both (+) and (−) angular positions, in order to balance the three vectors.

The invention disclosed in the Japanese Patent Publication No. 63048147 corresponds to the above auxiliary groove system, however, any effect of the auxiliary grooves is not recognized in a state that β, the inclined portion rate, is less than 20%. The effect of the auxiliary grooves can be recognized in a state that β is more than about 30%. In other words, a large effect can be obtained in a range that a width of an area having a value more than 90% of the peak value of the air gap magnetic flux density is less than 80% of a width of a pole pitch π. It is difficult to magnetize in practice in the state that the inclined portion rate β is zero. It is supposed that the inclined portion rate β is about 20% in case that a conventional magnetizing yoke is used. As a result, it is recognized that the clogging torque is not reduced in the Japanese Patent Publication No. 63048147.

The present invention can be obtained based on the above considerations.

SUMMARY OF THE INVENTION

An object of the present invention is to provide a permanent magnet and an armature having a plurality of winding grooves facing the permanent magnet with an air gap therebetween, the armature having a plurality of auxiliary grooves on a magnetic pole surface thereof, wherein a composite of two vectors of cogging torque generated by the auxiliary grooves is deviated by 180° from a vector of cogging torque generated by the winding grooves in the sixth harmonic plane, and wherein a width of Portion of an air gap magnetic flux density waveform that includes a value that is more than 90% of a peak value of an air gap magnetic flux density is less than 80% of a width of a pole pitch π portion of the air gap magnetic flux density waveform.

Another object of the present invention is to provide a permanent magnet and an armature having a plurality of winding grooves facing the permanent magnet with an air gap therebetween, the armature having a plurality of auxiliary grooves on a magnetic pole surface thereof, wherein each vector of cogging torque generated by each of the plurality of auxiliary grooves is deviated by 180° from a vector of cogging torque generated by the winding grooves in the sixth harmonic plane, respectively, and wherein a width of portion of an air gap magnetic flux density waveform that includes a value that is more than 90% of a peak value of the air gap magnetic flux density waveform is less than 80% of a width of a pole pitch π portion of the air gap magnetic flux density waveform.

A further object of the present invention is to provide a permanent magnet and an armature having a plurality of winding grooves facing the permanent magnet with an air gap therebetween, the armature having a plurality of auxiliary grooves on a magnetic pole surface thereof, wherein a composite two vectors of cogging torque generated by the auxiliary grooves is deviated by 120° from a vector of cogging torque generated by the winding grooves in the sixth harmonic plane, and wherein a width of portion of an air gap magnetic flux density waveform that includes a value that is more than 90% of a peak value of the air gap magnetic flux density waveform is less than 86% of a width of a pole pitch π portion of the air gap magnetic flux density waveform.

Yet further object of the present invention is to provide a permanent magnet and an armature having a plurality of winding grooves facing the permanent magnet with an air gap therebetween, the armature having a plurality of auxiliary grooves on a magnetic pole surface thereof, wherein each vector of cogging torque generated by each of the plurality of auxiliary grooves is deviated by 120° from a vector of cogging torque generated by the winding grooves in the sixth harmonic plane, respectively, and wherein a width of portion of an air gap magnetic flux density waveform a value more than 90% of a peak value of is less than 86% of a width of a pole pitch π portion of the air gap magnetic flux density waveform.

The permanent magnet is an inner rotor made of a pole-magnetized magnet.

The forgoing and other objects, features, and advantages of the present invention will become apparent from the following more particular description of preferred embodiments of the invention, as illustrated in the accompanying drawings.

DESCRIPTION OF THE PREFERRED EMBODIMENTS

Figure 5:
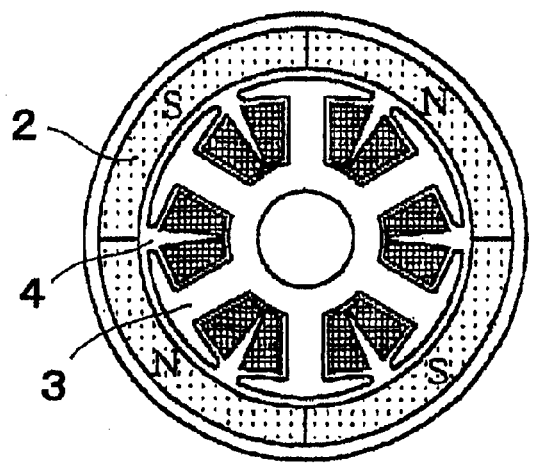
FIG. 5 is a vertically sectional front view of a non-lap concentration winding permanent magnet motor.
Figure 6A:
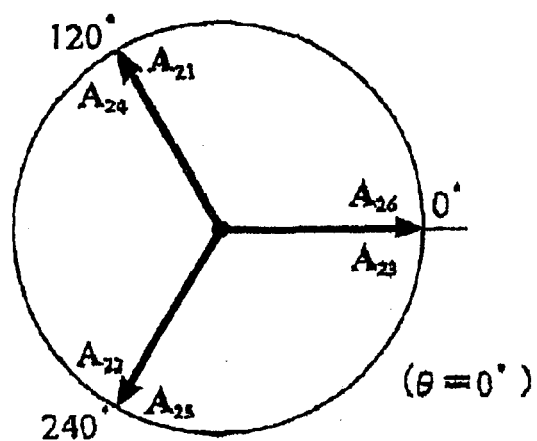
FIG. 6A shows groove vectors in the secondary harmonic plane of a conventional permanent magnet motor.
Figure 6B:
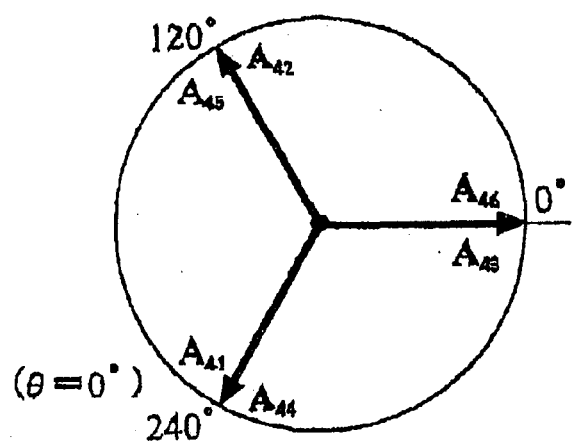
FIG. 6B shows groove vectors in the fourth harmonic plane of the motor shown in FIG. 6A.
Figure 7A:
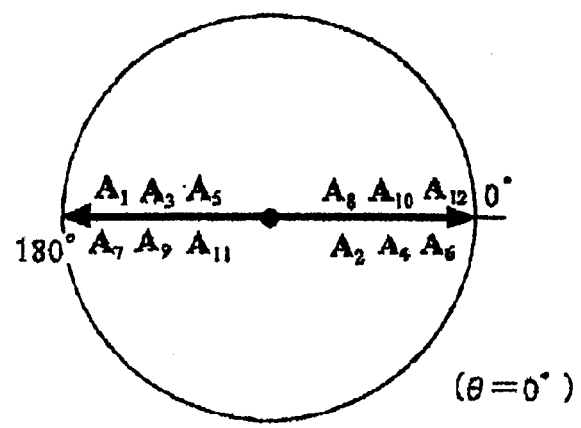
FIG. 7A shows vectors in the sixth harmonic plane of a motor having twelve winding grooves and ten poles.
Figure 7B:
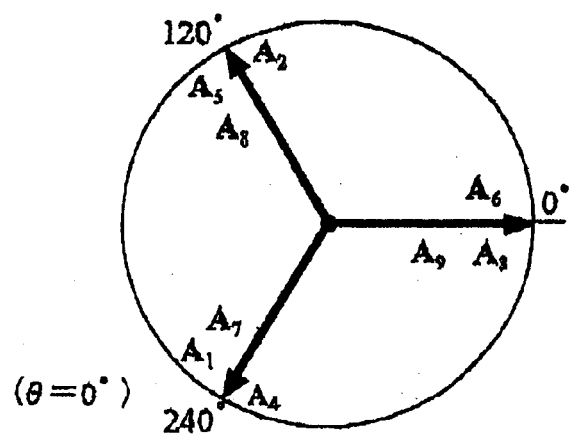
FIG. 7B shows vectors in the sixth harmonic plane of a motor having nine winding grooves and eight poles.
Figure 8A:
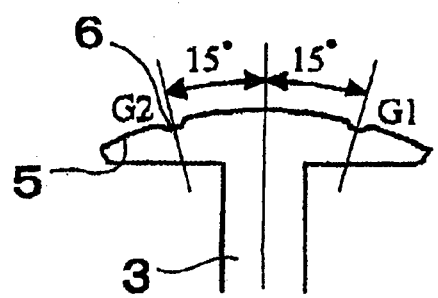
FIG. 8A is a view explaining auxiliary groove position of the motor of FIG. 5 having six winding grooves and four poles.
Figure 9A:
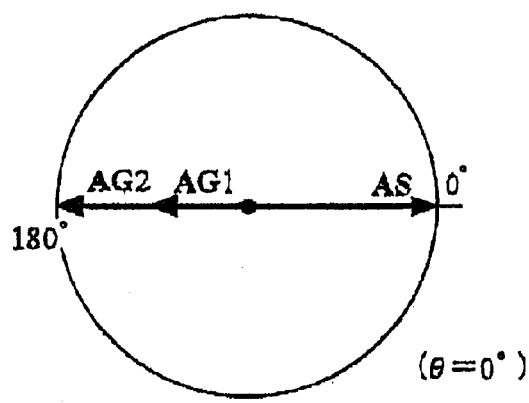
FIG. 9A shows vectors of winding grooves and auxiliary grooves of the motor shown in FIG. 8A.

FIG. 8A shows an representative example of a magnetic pole surface 5 of an armature 3 with auxiliary grooves 6 of the motor of FIG. 5 having six winding grooves and four poles. FIG. 9A shows a vector relation of this case. In FIG. 9A, a groove vector AS corresponds to a winding groove, and groove vectors AG1 and AG2 correspond to auxiliary grooves G1 and G2, respectively.

In general, it is aimed to cancel the effect of one winding groove by two auxiliary grooves, because the auxiliary groove is smaller in width and depth than the winding groove. Specifically, as shown in FIG. 8A, the positions of the auxiliary grooves G1 and G2 are deviated by (+) 15° and (−) 15° from the positions of the winding grooves, respectively, so that the positions of the auxiliary grooves are deviated by 180° (6 p times) from the position of the winding grooves in the sixth harmonic plane, and that the groove vectors AG1 and AG2 corresponding to the auxiliary grooves G1 and G2 are canceled by the groove vector AS corresponding to the winding groove.

Further, as apparent from FIG. 9A, a composite of two vectors of the auxiliary grooves should be balanced to the groove vector. Accordingly, it is sufficient that the sum of the vectors is positioned in the balanced position, even if the angular position of one vector is larger than a predetermined angular position and the angular position of the other vector is smaller than the predetermined angular position.

In FIG. 9A, the direction of the composite vector is not varied, because even if the angular positions of the auxiliary grooves G1 and G2 in FIG. 8A, are varied by a value from the predetermined position, the positions of the groove vectors AG1 and AG2 are varied by the same value in the opposite directions. If the auxiliary grooves are shifted from the predetermined positions, the composite vector becomes small, and accordingly the value of the shift should be limited.

FIG. 8A shows the motor having four magnetic poles, however, it is possible to balance the groove vector with a sum of four vectors by providing four small grooves in case of eight magnetic poles, because it is possible to provide four auxiliary groove positions in the Table 2.

Figure 8B:
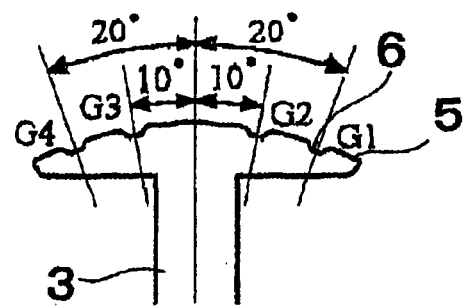
FIG. 8B is a view explaining auxiliary groove position of the motor of FIG. 5 having six winding grooves and four poles.
Figure 9B:
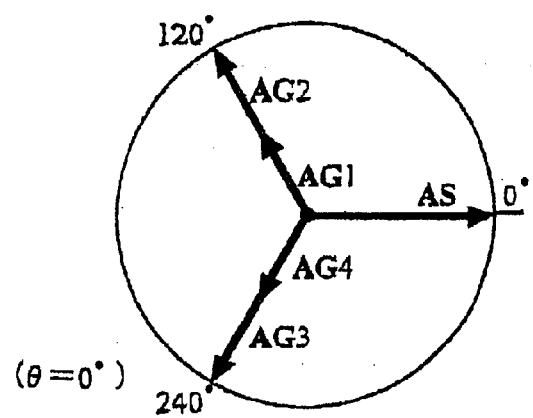
FIG. 9B shows vectors of winding grooves and auxiliary grooves of the motor shown in FIG. 8B.

FIG. 9B shows an example of a magnetic pole surface 5 of an armature 3 with other auxiliary grooves 6 of the motor of FIG. 5 having six winding grooves and four poles. FIG. 9B shows a vector relation of this case. In FIG. 9B, a groove vector AS corresponds to a winding groove, and groove vectors AG1, AG2, AG3 and AG4 correspond to auxiliary grooves G1, G2, G3 and G4, respectively. In general, it is aimed to cancel the effect of one winding groove by two auxiliary grooves, because the auxiliary groove is smaller in width and depth than the winding groove. Specifically, as shown in FIG. 8B, the positions of the auxiliary grooves G1 and G4 are deviated by (+) 10° and (−) 10° from the position of the winding groove, respectively, and the auxiliary grooves G3 and G2 are deviated by (+) 40° and (−) 40° from the position of the winding groove, respectively, so that the positions of the auxiliary grooves are deviated by ±120° and ±240° (6 p times) from the position of the winding groove in the sixth harmonic plane, and that the auxiliary vectors are canceled by the groove vector.

In FIG. 8B, even if the angles of the auxiliary grooves G1 and G4 are set smaller a little than the predetermined angles and the angles of the auxiliary grooves G2 and G3 are set larger a little than the predetermined angles, the balance conditions are still maintained, if a position of the composite vector of them is the predetermined position.

Inspection by FEM Magnetic Field Analysis

The method of reducing the cogging torque generated by the magnetic poles and the iron core grooves is studied as mentioned above. A representative motor will now be inspected by the magnetic field analysis based on the second dimension finite element method (FEM). The cogging torque is calculated by the Maxwell stress method while rotating the rotor by an angle corresponding to one magnetic pole. In order to increase the precision of the calculation, triangle meshes for dividing the air gap portion equally with intervals of 1° or 0.5° in the peripheral direction thereof and for dividing into three layers in the radial direction thereof are used.

The Maxwell stress is calculated by using a mean value of the magnetic flux densities of the triangle elements adjacent to each other in the radial direction at the air gap center.

The motor shown in the Table 1 is of multipoles more than eight poles, however, a magnetic pole number less than eight poles may be required for the motor of high speed, low cost and high efficiency. In such case, it is preferable to provide the above mentioned auxiliary grooves. A motor having six winding grooves and four magnetic poles will now be examined.

Figure 1:
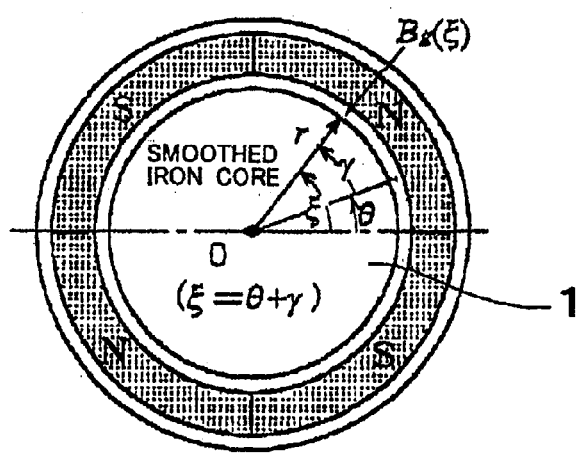
FIG. 1 is a vertically sectional front view of a conventional smoothed iron core model having no grooves.
Figure 2:
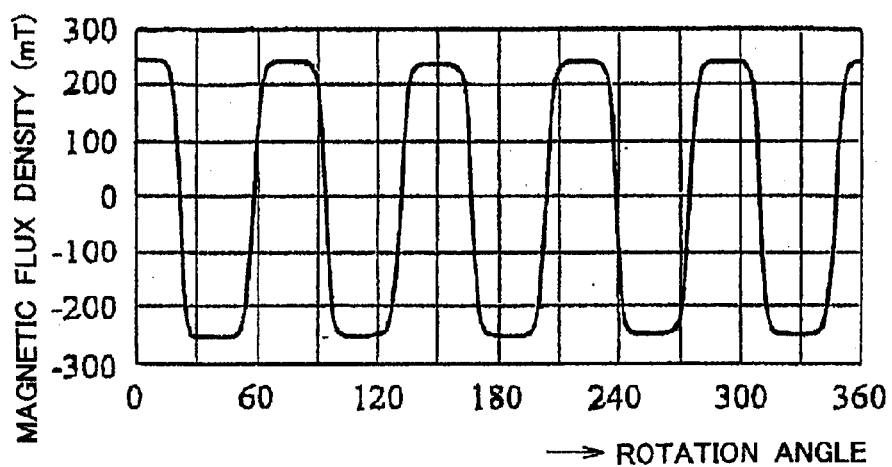
FIG. 2 is a graph showing an air gap magnetic flux density distribution of a permanent magnet motor having ten poles.
Figure 3:
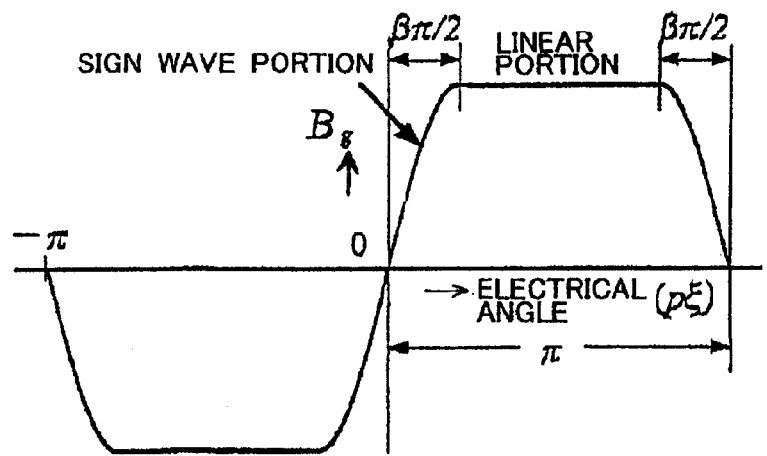
FIG. 3 is a view explaining an air gap magnetic flux density distribution of the smoothed iron core model shown in FIG. 1.
Figure 4:
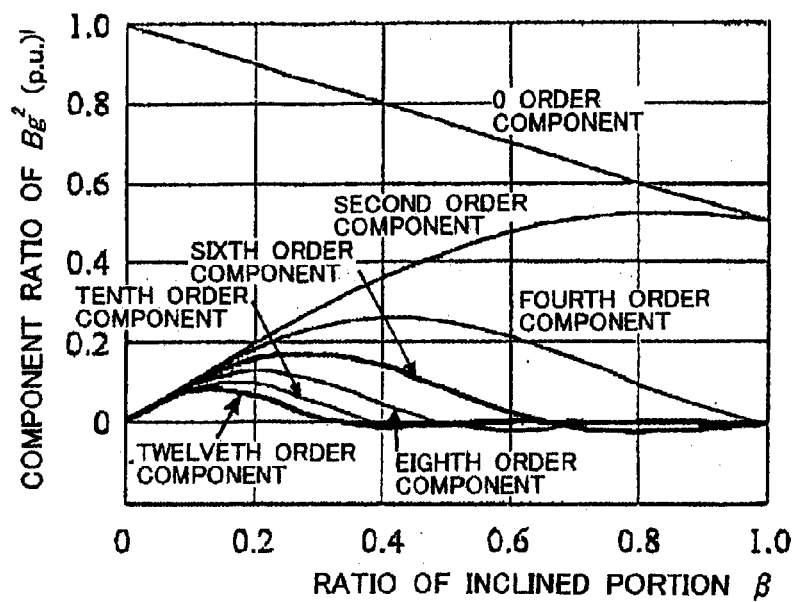
FIG. 4 is a graph showing the change of harmonic components of $Bg^2$ with respect to an inclined portion rate ($\beta$) of the magnetic flux density distribution (Bg).
Figure 10A:
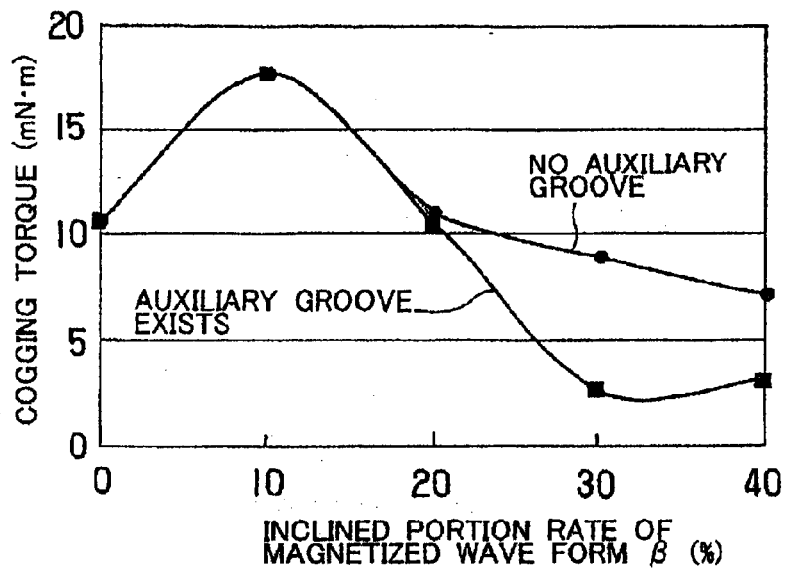
FIG. 10A is a graph showing the relation between the auxiliary grooves shown in FIG. 8A and the cogging torque.
Figure 10B:
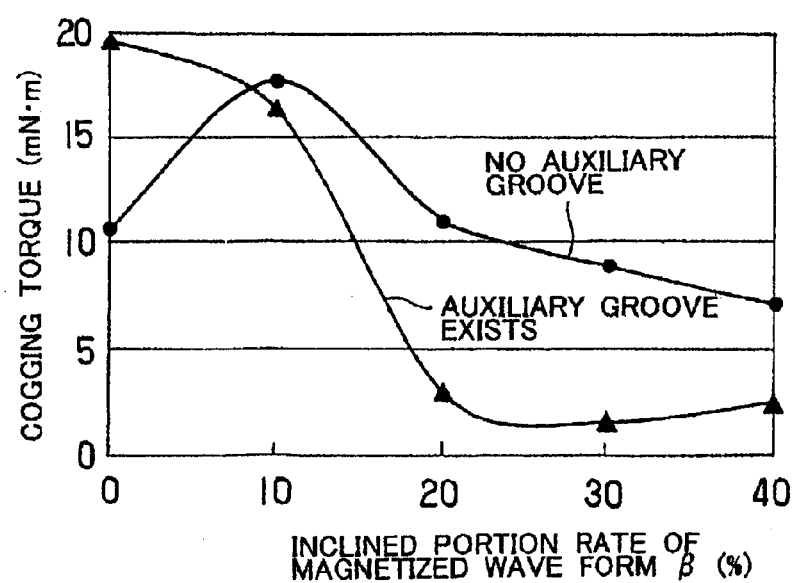
FIG. 10B is a graph showing the relation between the auxiliary grooves shown in FIG. 8B and the cogging torque.

The cogging torques of the Motors shown in FIG. 8A and FIG. 8B were calculated in consideration that the permanent magnet was magnetized uniformly in the radial direction. However, any effect could not be observed against our expectations. Accordingly, a calculation was carried out by reducing the magnetic strength at both ends of the magnet along the curve of sine wave as shown in FIG. 3 in order to reduce the sixth and twelfth harmonic energies. The results are shown in FIG. 10A and FIG. 10B.

Figure 11A:
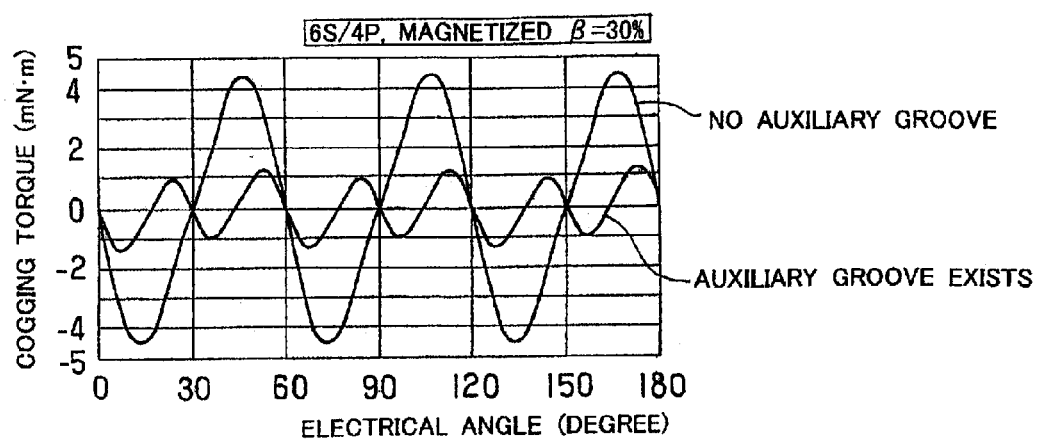
FIG. 11A is a graph showing wave forms of the cogging torque in case that the auxiliary grooves are provided.

It is apparent that any effective result cannot be obtained unless the inclined portion rate β is increased more than 30% with respect to the auxiliary grooves shown in FIG. 8A. It is difficult to magnetize in practice in the state that the inclined portion rate β is zero. It is supposed that the inclined portion rate β is about 20% in case that a conventional magnetizing yoke is used. Accordingly, it is necessary to determine a magnetizing pattern so as to have a necessary inclined portion according to the auxiliary groove system. FIG. 11A shows cogging torque wave forms in case that the inclined portion rate β of the magnetic wave form is 30%. Pulses of sixth harmonic are generated in case that the auxiliary groove is not formed, and pulses of twelfth harmonic are generated in case that the auxiliary groove is formed. The consideration coincides with the consideration about the energy balance by the auxiliary groove.

Figure 12:
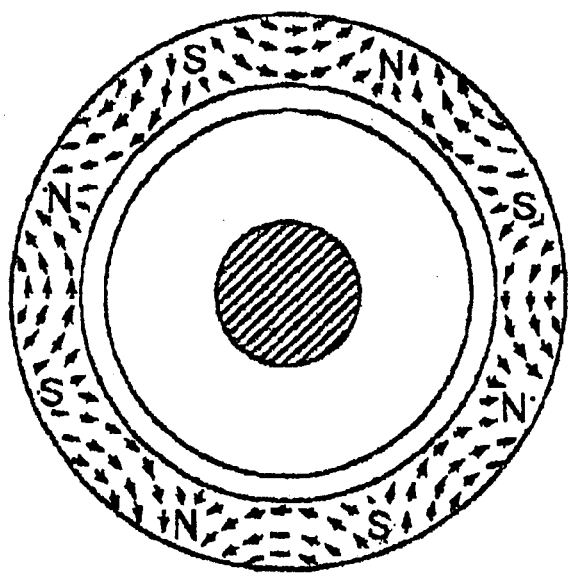
FIG. 12 is a vertically sectional front view of an inner rotor having an anisotropic magnet.

The above calculation was carried out with respect to the motor wherein the magnet is an outer rotor. Similar results can be obtained with respect to the motor wherein the magnet is an inner rotor as shown in FIG. 12. It is considered that the auxiliary groove system is optimum to a case that pole-magnetized magnet of inner rotor type generating an air gap magnetic field distribution similar to a sine wave is used. The pole-magnetized magnet is a magnet magnetized along the magnetic flux flow as shown in FIG. 12.

Figure 11B:
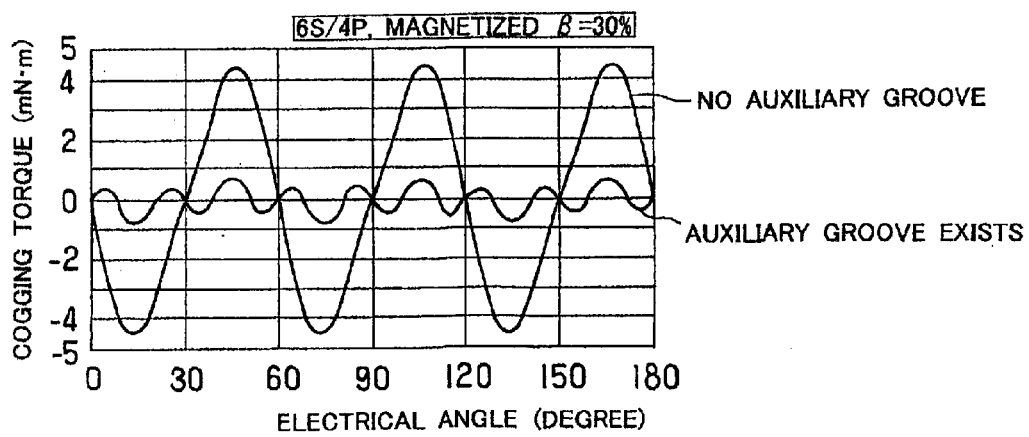
FIG. 11B is a graph showing wave forms of the cogging torque in case that the auxiliary grooves are provided.

It is apparent that any effective result cannot be obtained unless the inclined portion rate β is increased more than 20% with respect to the auxiliary grooves shown in FIG. 8B. It is difficult to magnetize in practice in the state that the inclined portion rate β is zero. It is supposed that the inclined portion rate β is about 20% in case that a conventional magnetizing yoke is used. Accordingly, it is necessary to determine a magnetizing pattern so as to have a necessary inclined portion according to the auxiliary groove system. FIG. 11B shows cogging torque wave forms in case that the inclined portion rate β of the magnetic wave form is 30%.

Pulses of sixth harmonic are generated in case that the auxiliary groove is not formed, and pulses of 18th harmonic are generated in case that the auxiliary groove is formed. The consideration coincides with the consideration about the energy balance by the auxiliary groove.

The above calculation was carried out with respect to the motor wherein the magnet is an outer rotor. Similar results can be obtained with respect to the motor wherein the magnet is an inner rotor as shown in FIG. 12. It is considered that the auxiliary groove system is optimum to a case that pole-magnetized magnet of inner rotor type generating an air gap magnetic field distribution similar to a sine wave is used.

Any effect of the auxiliary groove is not recognized in a state that β is less than 10%, that is, a normal magnetized state as shown in FIG. 10B. The effect of the auxiliary groove can be recognized in a state that β is more than about 20%. In other words, a large effect can be obtained in a range wherein a width of a portion of an air gap magnetic flux density waveform that includes a value that is more than 90% of a peak value of the air gap magnetic flux density waveform is less than 86% of a width of a pole pitch π (with reference to FIG. 3).

The present invention, relates to a permanent magnet motor comprising as shown in FIG. 5 a permanent magnet 2 having four poles, and an armature 3 having six winding grooves 4 facing the permanent magnet 2 with an air gap therebetween. As shown in FIG. 8A, two auxiliary grooves 6 are provided at positions G1 and G2 on a magnetic pole surface 5 of the armature 3, so that a composite of two vectors of cogging torque generated by the auxiliary grooves 6 is deviated by 180° from a vector of cogging torque generated by the winding grooves 4 in the sixth harmonic plane, and that a width of a portion of an air gap magnetic flux density waveform that includes a value that is more than 90% of a peak value of the air gap magnetic flux density waveform is less than 80% of a width of a pole pitch π portion of the air gap magnetic flux density waveform.

A permanent magnet motor of another embodiment of the present invention, as shown in FIG. 5, comprises a permanent magnet 2 having four poles, and an armature 3 having six winding grooves 4 facing the permanent magnet 2 with an air gap herebetween. As shown in FIG. 8A, two auxiliary grooves 6 are provided at positions G1 and G2 on a magnetic pole surface 5 of the armature 3, so that each vector of cogging torque generated by each of the plurality of auxiliary grooves 6 is deviated by 180° from a vector of cogging torque generated by the winding grooves 4 in the sixth harmonic plane, and that a width of a portion of an air gap magnetic flux density waveform that includes a value that is more than 90% of a peak value of the air gap magnetic flux density waveform is less than 80% of a width of a pole pitch π portion of the air gap magnetic flux density waveform.

A permanent magnet motor of a further embodiment of the present invention comprises, as shown in FIG. 5, a permanent magnet 2 having four poles, and an armature 3 having six winding grooves 4 facing the permanent magnet 2 with an air gap therebetween. As shown in FIG. 8B, four auxiliary grooves 6 are provided at positions G1 to G4 on a magnetic pole surface 5 of the armature 3, so that composite of two vector of cogging torque generated by the auxiliary grooves 6 is deviated by 120° from a vector of cogging torque generated by the winding grooves 4 in the sixth harmonic plane, and that a width of a portion of an air gap magnetic flux density waveform that includes a value that is more than 90% of a peak value of the air gap magnetic flux density waveform is less than 86% of a width of a pole pitch π portion of the air gap magnetic flux density waveform.

A permanent magnet motor in the other embodiment of the present invention, as shown in FIG. 5, comprises a permanent magnet 2 having four poles, and an armature 3 having six winding grooves 4 facing the permanent magnet 2 with an air gap therebetween. As shown in FIG. 8B, four auxiliary grooves 6 are provided at positions G1 to G4 on a magnetic pole surface 5 of the armature 3, so that each vector of cogging torque generated by each of the plurality of auxiliary grooves 6 is deviated by 120° from a vector of cogging torque generated by the winding grooves 4 in the sixth harmonic plane, and that a width of a portion of an air gap magnetic flux density waveform that includes a value that is more than 90% of a peak value of the air gap magnetic flux density waveform is than 86% of a width of a pole pitch π portion of the air gap magnetic flux density waveform.

A pole-magnetized magnet of inner rotor type may be used instead of the permanent magnet 2.

As stated above, according to the permanent magnet of the present invention, the cogging torque can be reduced by a simple construction, and the frequency of the magnetic flux becomes lower, so that the motor can be used as a high speed motor having a lower oscillation and a higher efficiency.

While the invention has been particularly shown and described with reference to the preferred embodiments thereof, it will be understood by those skilled in the art that various changes in form and details may be made therein without departing from the spirit and scope of the invention defined by the appended claims.

What is claimed is:

1. A permanent magnet motor comprising a permanent magnet and an armature having a plurality of winding grooves facing the permanent magnet with an air gap therebetween, the armature having a plurality of auxiliary grooves on a magnetic pole surface thereof, wherein a composite of two vectors of cogging torque generated by the auxiliary grooves is deviated by 180° from a vector of cogging torque generated by the winding grooves in the sixth harmonic plane, and wherein a width of a portion of an air gap magnetic flux density waveform that includes a value that is more than 90% of a peak value of the air gap magnetic flux density waveform is less than 80% of a width of a pole pitch π portion of the air gap magnetic flux density waveform.

2. A permanent magnet motor comprising a permanent magnet and an armature having a plurality of winding grooves facing the permanent magnet with an air gap therebetween, the armature having a plurality of auxiliary grooves on a magnetic pole surface thereof, wherein each vector of cogging torque generated by each of the plurality of auxiliary grooves is deviated by 180° from a vector of cogging torque generated by the winding groove in the sixth harmonic plane, respectively, and wherein a width of a portion of an air gap magnetic flux density waveform that includes a value that is more than 90% of a peak value of the air gap magnetic flux density waveform is less than 80% of a width of a pole pitch π portion of the air gap magnetic flux density waveform.

3. A permanent magnet motor comprising a permanent magnet and an armature having a plurality of winding grooves facing the permanent magnet with an air gap therebetween, the armature having a plurality of auxiliary grooves on a magnetic pole surface thereof, wherein a composite of two vectors of cogging torque generated by the auxiliary grooves is deviated by 120° from a vector of cogging torque generated by the winding grooves in the sixth harmonic plane, and wherein a width of a portion of an air zap magnetic flux density waveform that includes a value that is more than 90% of a peak value of the air gap magnetic flux density waveform is less than 86% of a width of a pole pitch π portion of the air gap magnetic flux density waveform.

4. A permanent magnet motor comprising a permanent magnet and an armature having a plurality of winding grooves facing the permanent magnet with an air gap therebetween, the armature having a plurality of auxiliary grooves on a magnetic pole surface thereof, wherein each vector of cogging torque generated by each of the plurality of auxiliary grooves is deviated by 120° from a vector of cogging torque generated by the winding groove in the sixth harmonic plane, respectively, and wherein a width of a portion of an air gap magnetic flux density waveform that includes a value that is more than 90% of a peak value of the air gap magnetic flux density waveform is less than 86% of a width of a pole pitch π portion of the air gap magnetic flux density waveform.

5. The permanent magnet motor as claimed in claim 1, wherein the permanent magnet is an inner rotor made of a pole-magnetized magnet.

6. The permanent magnet motor as claimed in claim 2, wherein the permanent magnet is an inner rotor made of a pole-magnetized magnet.

7. The permanent magnet motor as claimed in claim 3, wherein the permanent magnet is an inner rotor made of a pole-magnetized magnet.

8. The permanent magnet motor as claimed in claim 4, wherein the permanent magnet is an inner rotor made of a pole-magnetized magnet.

* * * * *